US009913013B1

(12) United States Patent
Santoro et al.

(10) Patent No.: US 9,913,013 B1
(45) Date of Patent: Mar. 6, 2018

(54) DEVICE FOR INSTALLATION AND REMOVAL OF A CEILING SPEAKER SYSTEM

(71) Applicant: Bose Corporation, Framingham, MA (US)

(72) Inventors: Peter C. Santoro, Groton, MA (US); Dennis E. Meyer, Jr., Millbury, MA (US); Robert Warden, Southborough, MA (US); Gregor Mittersinker, Providence, RI (US); Seung Hyuk Noh, Providence, RI (US); Christopher O'Connell, Providence, RI (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 15/332,223

(22) Filed: Oct. 24, 2016

(51) Int. Cl.
| | |
|---|---|
| *H04R 1/02* | (2006.01) |
| *E04B 9/00* | (2006.01) |
| *H02G 3/38* | (2006.01) |

(52) U.S. Cl.
CPC ............. *H04R 1/025* (2013.01); *E04B 9/006* (2013.01); *H02G 3/281* (2013.01); *H04R 1/026* (2013.01)

(58) Field of Classification Search
CPC combination set(s) only.
See application file for complete search history.

(56) References Cited

U.S. PATENT DOCUMENTS

| | | | |
|---|---|---|---|
| 7,540,460 B2 * | 6/2009 | Orth ................ | H04R 1/026 248/343 |
| 8,311,262 B2 | 11/2012 | Kulchy et al. | |
| 8,403,107 B2 | 3/2013 | Stewart, Jr. et al. | |
| 8,485,487 B2 * | 7/2013 | Cheng ............... | H04R 1/026 248/201 |

* cited by examiner

*Primary Examiner* — Amir Etesam
(74) *Attorney, Agent, or Firm* — Schmeiser, Olsen & Watts LLP; William G. Guerin

(57) ABSTRACT

A device for securing an object to a ceiling includes a threaded rod, a bracket and a spring-loaded tab. The spring-loaded tab has a tab portion with an outer surface. The tab portion is rotatable about an axis perpendicular to the threaded rod. When the device is attached to the object and the object moves into an opening in the ceiling for installation to the ceiling, the tab portion is urged from an extended position to enable the object to pass through the opening. Subsequently, the tab portion returns to its extended position such that the object can be temporarily supported by the tab within the ceiling opening. The bracket is configured so that during a removal process, a portion of the bracket urges the tab portion inward from the extended position to enable the object to be removed from the ceiling opening.

19 Claims, 10 Drawing Sheets

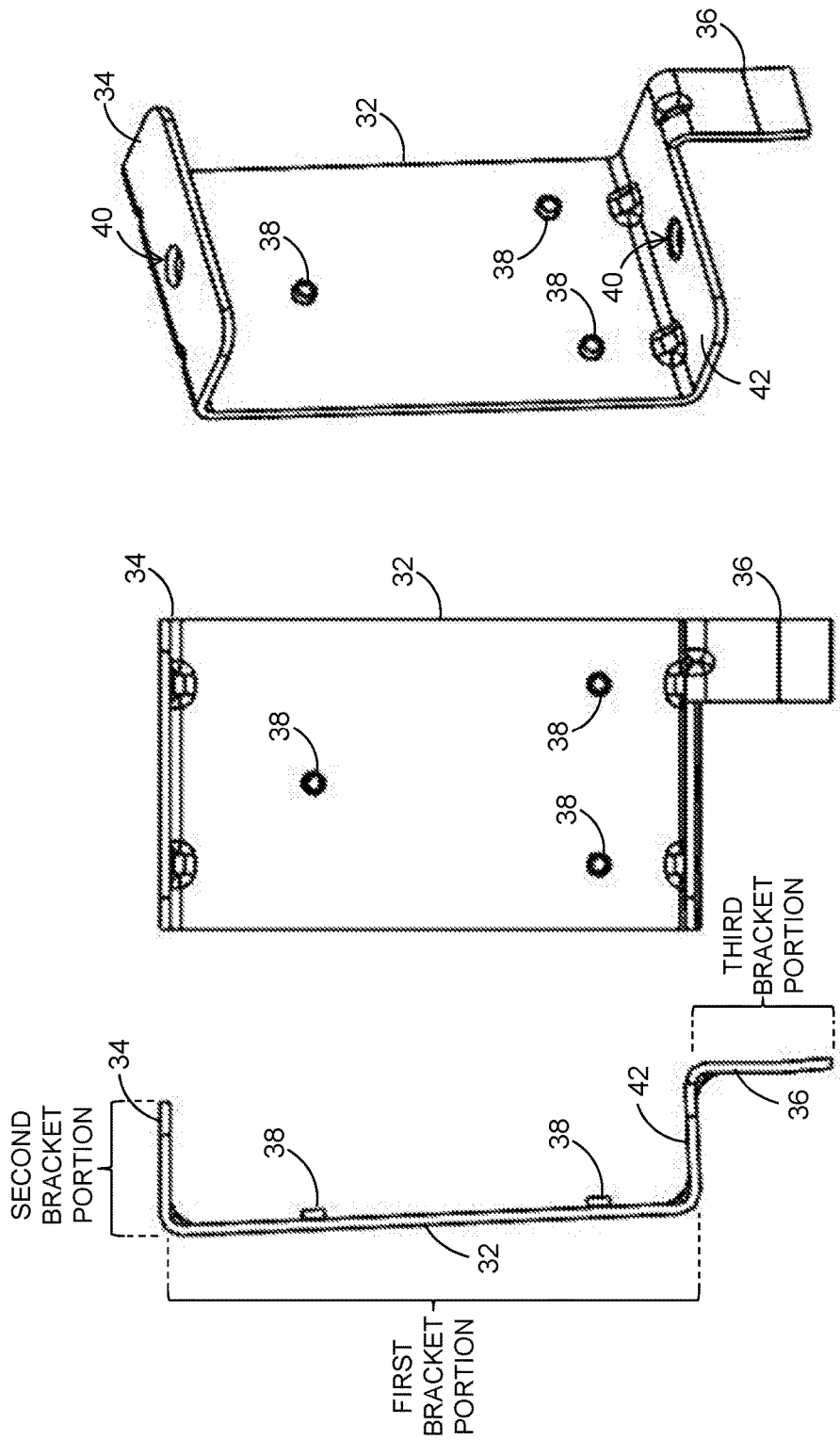

DEVICE FOR INSTALLATION AND REMOVAL OF A CEILING SPEAKER SYSTEM

BACKGROUND

This disclosure relates to devices for mounting a speaker system to a ceiling. The devices provide temporary support during the installation process and clamp the speaker system to the ceiling to complete the installation process.

SUMMARY

In one aspect, a device for securing an object to a ceiling includes a threaded rod, a bracket and a spring-loaded tab. The threaded rod has a rod axis, a first end to receive a driver tool and a second end. The bracket has a first bracket portion secured to a side of the object and a second bracket portion engaging the second end of the threaded rod. The spring-loaded tab has a first tab portion that includes a stop surface and a threaded passage in engagement with the threaded rod, a second tab portion having an outer surface, and a spring mechanism in communication with the first and second tab portions. The second tab portion is rotatable about an axis substantially perpendicular to the rod axis between a first angular position in which the outer surface is substantially parallel to the rod axis and a second angular position in which the second tab portion engages the stop surface of the first tab portion. When the device is attached to the object and the object moves forward through an opening in the ceiling such that the outer surface of the second tab portion is in contact with a side of the opening, the second tab portion is urged from the second angular position toward the first angular position. When the object is further moved forward through the opening such that the second tab portion is no longer in contact with the side of the opening, the second tab portion engages the stop surface of the first tab portion so that the outer surface is at the second angular position.

Examples may include one or more of the following features:

The object may be a speaker system.

The device may include a cap nut attached to the second end of the threaded rod to prevent the threaded rod from retracting from the second bracket portion.

The bracket may have a third bracket portion so that when the threaded rod is rotated such that the object moves in reverse down through the opening in the ceiling, the third bracket portion engages the outer surface of the second tab portion to urge the second tab portion from the second angular position toward the first angular position.

The spring-loaded tab may include a spring wire attached to the first and second tab portions. The spring wire may be configured to urge the second tab portion against the stop surface of the first tab portion.

The threaded rod may be a screw and the first end of the threaded rod may include a screw head configured to receive a screwdriver.

The second tab portion may have a ceiling clamp surface wherein, after the second tab portion engages the stop surface of the first tab portion so that the outer surface is at the second angular position, the ceiling clamp surface abuts a top surface of the ceiling to support the object. When the ceiling clamp surface of the second tab portion abuts the top surface of the ceiling, a rotation of the threaded rod about the rod axis further moves the object through the opening in the ceiling until a portion of the ceiling is secured between the ceiling clamp surface and a portion of the object.

In accordance with another aspect, a ceiling speaker system includes a speaker system having at least one electro-acoustic driver and an enclosure. The ceiling speaker system also includes a plurality of threaded rods, a plurality of brackets and a plurality of spring-loaded tabs. Each threaded rod has a rod axis, a first end to receive a driver tool and a second end. Each bracket has a first bracket portion secured to a side of the enclosure and a second bracket portion engaging the second end of a respective one of the threaded rods. Each spring-loaded tab has a first tab portion that includes a stop surface and a threaded passage in engagement with a respective one of the threaded rods, a second tab portion having an outer surface, and a spring mechanism in communication with the first and second tab portions. The second tab portion is rotatable about an axis substantially perpendicular to the rod axis between a first angular position in which the outer surface is substantially parallel to the rod axis and a second angular position in which the second tab portion engages the stop surface of the first tab portion. When the speaker system moves forward through an opening in the ceiling such that the outer surface of the second tab portion is in contact with a side of the opening, the second tab portion is urged from the second angular position toward the first angular position. When the speaker system is further moved forward through the opening such that the outer surface is no longer in contact with the side of the opening, the second tab portion engages the stop surface of the first tab portion so that the outer surface is at the second angular position.

Examples may include one or more of the following features:

Each of the brackets may have a third bracket portion wherein, when the threaded rods are rotated such that the speaker system moves in reverse down through the opening in the ceiling, the third bracket portions engage the outer surface of the second tab portions to urge the second tab portions from the second angular position toward the first angular position.

A width of the enclosure along a first horizontal axis may be less than a width of the opening along the first horizontal axis, wherein a sum of the width of the enclosure along the first horizontal axis and a maximum horizontal extension along the first axis of at least one of the spring-loaded tabs is greater than the horizontal width of the opening.

The second tab portion of each of the spring-loaded tabs may have a ceiling clamp surface wherein, after the second tab portion engages the stop surface of the first tab portion so that the outer surface is at the second angular position, the ceiling clamp surface abuts a top surface of the ceiling to support the object. When the ceiling clamp surface of the second tab portion abuts the top side of the ceiling, a rotation of the threaded rod about the rod axis further moves the object through the opening in the ceiling until a portion of the ceiling is secured between the ceiling clamp surface and a portion of the object.

In accordance with yet another aspect, a device for securing an object to a ceiling includes a threaded rod, a cap nut, a bracket and a spring-loaded tab. The threaded rod has a rod axis, a head to receive a driver tool and an end that is opposite to the head. The cap nut is secured to the end of the threaded rod. The bracket has a first bracket portion configured to be attached to a side of the object, a second bracket portion engaging the cap nut at the end of the threaded rod, and a third bracket portion at an end of the bracket that is opposite to the second bracket portion. The spring-loaded tab has a first tab portion that includes a stop surface and a threaded passage in engagement with the threaded rod, a second tab portion having an outer surface, and a spring mechanism in communication with the first and second tab portions. The second tab portion is rotatable about an axis substantially perpendicular to the rod axis between a first angular position in which the outer surface is substantially parallel to the rod axis and a second angular position in which the second tab portion engages the stop surface of the first tab portion. When the device is attached to the object and the object moves forward through an opening in the ceiling such that the outer surface of the second tab portion is in contact with a side of the opening, the second tab portion is urged from the second angular position toward the first angular position. When the object is further moved forward through the opening such that the second tab portion is no longer in contact with the side of the opening, the second tab portion engages the stop surface of the first tab portion so that the outer surface is at the second angular position. When the threaded rod is rotated such that the object moves in reverse down through the opening in the ceiling, the third bracket portion engages the outer surface of the second tab portion to urge the second tab portion from the second angular position toward the first angular position.

Examples may include one or more of the following features:

The spring mechanism may include a spring wire. The spring wire may be configured to urge the second tab portion against the stop surface of the first tab portion.

The second tab portion may have a ceiling clamp surface wherein, after the second tab portion engages the stop surface of the first tab portion so that the outer surface is at the second angular position, the ceiling clamp surface abuts a top surface of the ceiling to support the object. When the ceiling clamp surface of the second tab portion abuts the top surface of the ceiling, a rotation of the threaded rod about the rod axis may further move the object through the opening in the ceiling until a portion of the ceiling is secured between the ceiling clamp surface and a portion of the object.

BRIEF DESCRIPTION OF THE DRAWINGS

The above and further advantages of examples of the present inventive concepts may be better understood by referring to the following description in conjunction with the accompanying drawings, in which like numerals indicate like structural elements and features in various figures. The drawings are not necessarily to scale, emphasis instead being placed upon illustrating the principles of features and implementations.

FIG. 3A, FIG. 3B and FIG. 3C show the bracket in FIG. 2 from a perspective view, front view and side view, respectively.

DETAILED DESCRIPTION

Speaker systems and other objects or structures are often surface mounted to various structures such as ceilings. Different types of anchor systems can be used to reliably secure a speaker system to a mounting substrate. In the various examples of devices for securing an object to a ceiling described below, spring-loaded tabs are used to provide temporary support during an installation process. The described examples have the advantage of providing for easy removal of an object installed in a ceiling. In particular, the devices permit the spring-loaded tabs to retract during installation to and removal from a ceiling such that the object can pass through an opening in the ceiling without interference.

In the various devices and systems described below, "bracket" refers to an object that can be attached to a wall and used to support or hold another object or structure. A "fastening member" is a device or component used to mechanically join or affix two or more objects to each other. A "cap" includes a lid or cover that can be attached to at least a portion of an object. A ceiling, as used herein, means the upper interior structure of a room or dwelling. A ceiling may be horizontal or may be inclined at an angle from a horizontal orientation.

Figure 1A:
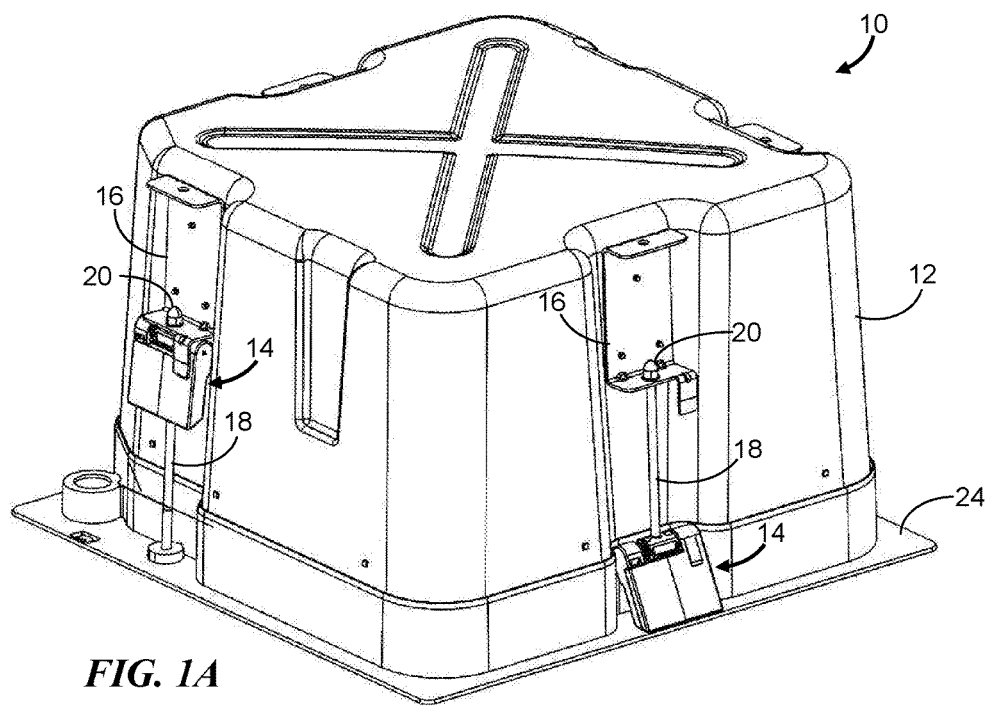
FIG. 1A is an illustration of a ceiling speaker system with an enclosure and mounting devices.

FIG. 1A shows an example of a ceiling speaker system 10 that includes an enclosure 12 and four mounting devices (only two visible) used to mount the system 10 to a ceiling. Each device includes a spring-loaded tab 14, a bracket 16, a threaded rod 18 and a cap nut, or acorn nut, 20.

Figure 1B:
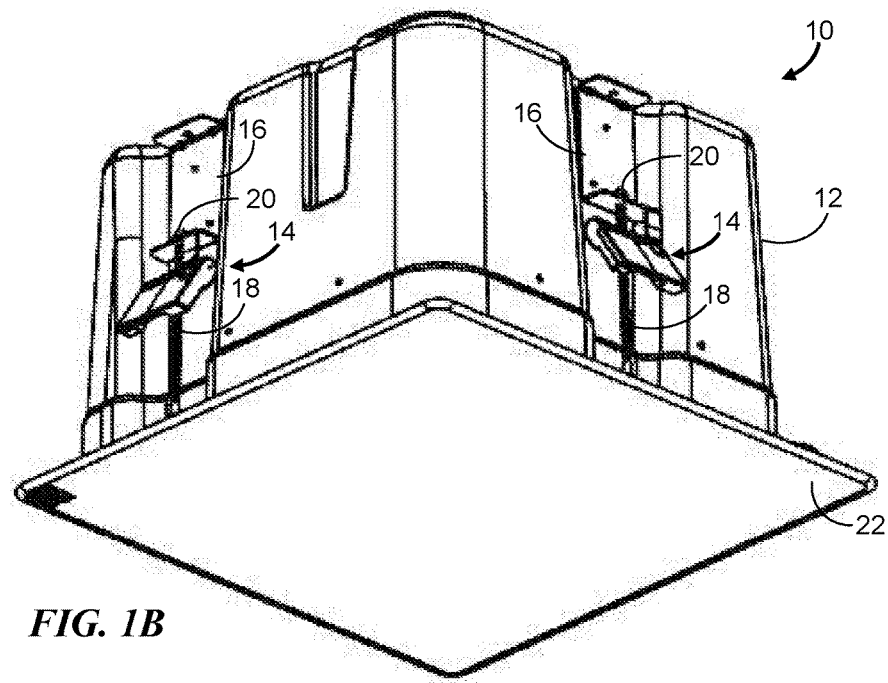
FIG. 1B is a bottom view of the ceiling speaker system of FIG. 1A.

FIG. 1B shows a bottom view of the system 10 with a rectangular grille 22 at the system base. For example, the grille 22 may be attached to a flange 24 via magnetic connectors on the flange 24 and/or on the top side of the grille 22. The grille 22 shields and protects internal system components while being substantially acoustically transparent to acoustic signals generated by the speaker system 10. It will be noted that the position and angular orientation of the spring-loaded tabs 14 along their threaded rods in FIGS. 1A and 1B are generally different although, as described below, once the speaker system 10 is installed in the ceiling, the position and angular orientation of the spring-loaded tabs 14 with respect to their threaded rods 18 are nominally the same.

Figure 2:
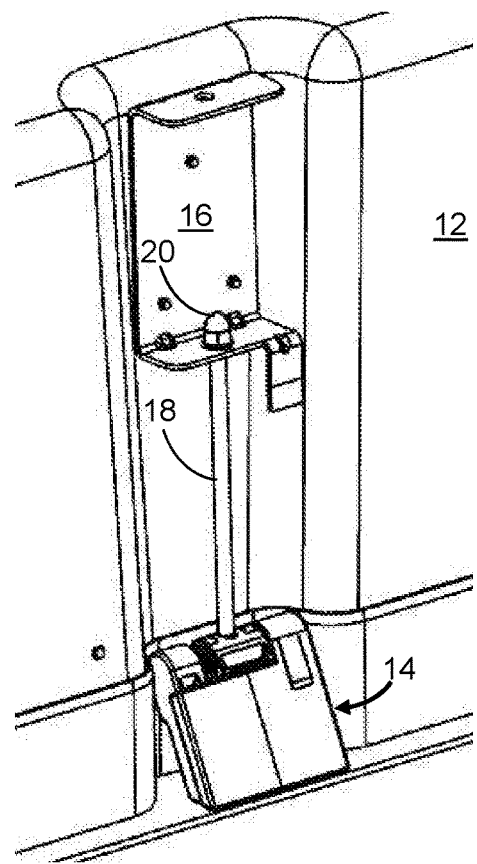
FIG. 2 shows a single mounting device in FIG. 1A as attached to a recessed portion of one side of the enclosure.

FIG. 2 is a view of a single mounting device attached to a recessed portion of one side of the enclosure 12 with the spring-loaded tab 14 located near the bottom of the enclosure 12. The threaded rod 18 is substantially parallel to the adjacent side of the enclosure and has a head at one end configured to receive a driver tool, such as a screwdriver or socket driver, which enables an installer to rotate the rod 18. The cap nut 20 is attached to the opposite end of the threaded rod 18 and prevents the rod 18 from retracting or moving downward through the bracket 16 while allowing the rod 18 to rotate freely about its axis during installation and removal of the ceiling speaker system.

FIGS. 3A to 3C show the bracket 16 from a side view, front view and perspective view, respectively. The bracket 16 includes a first bracket portion 32 having openings 38 to engage or pass screws, bolts or rivets for securing the bracket 16 to the enclosure 12. The bracket 16 also includes a second bracket portion 34 extending substantially perpendicularly from the first bracket portion 32 at one end and includes a third bracket portion 36 at the bottom of the bracket 16. Two openings 40 are provided in the bracket 16. One of the openings 40 allows the threaded rod 18 to pass through a section 42 that extends between the bottom of the first bracket portion 32 and the top of the third bracket portion 36. The other opening 40 is in the second bracket portion 34 for use as a supplemental hang point.

Figure 4:
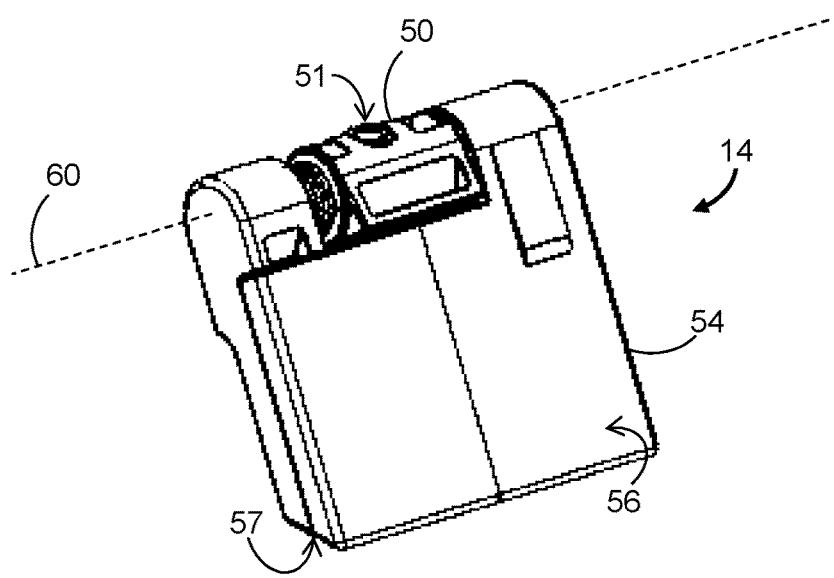
FIG. 4 shows a perspective view of the spring-loaded tab of FIG. 2.
Figure 5:
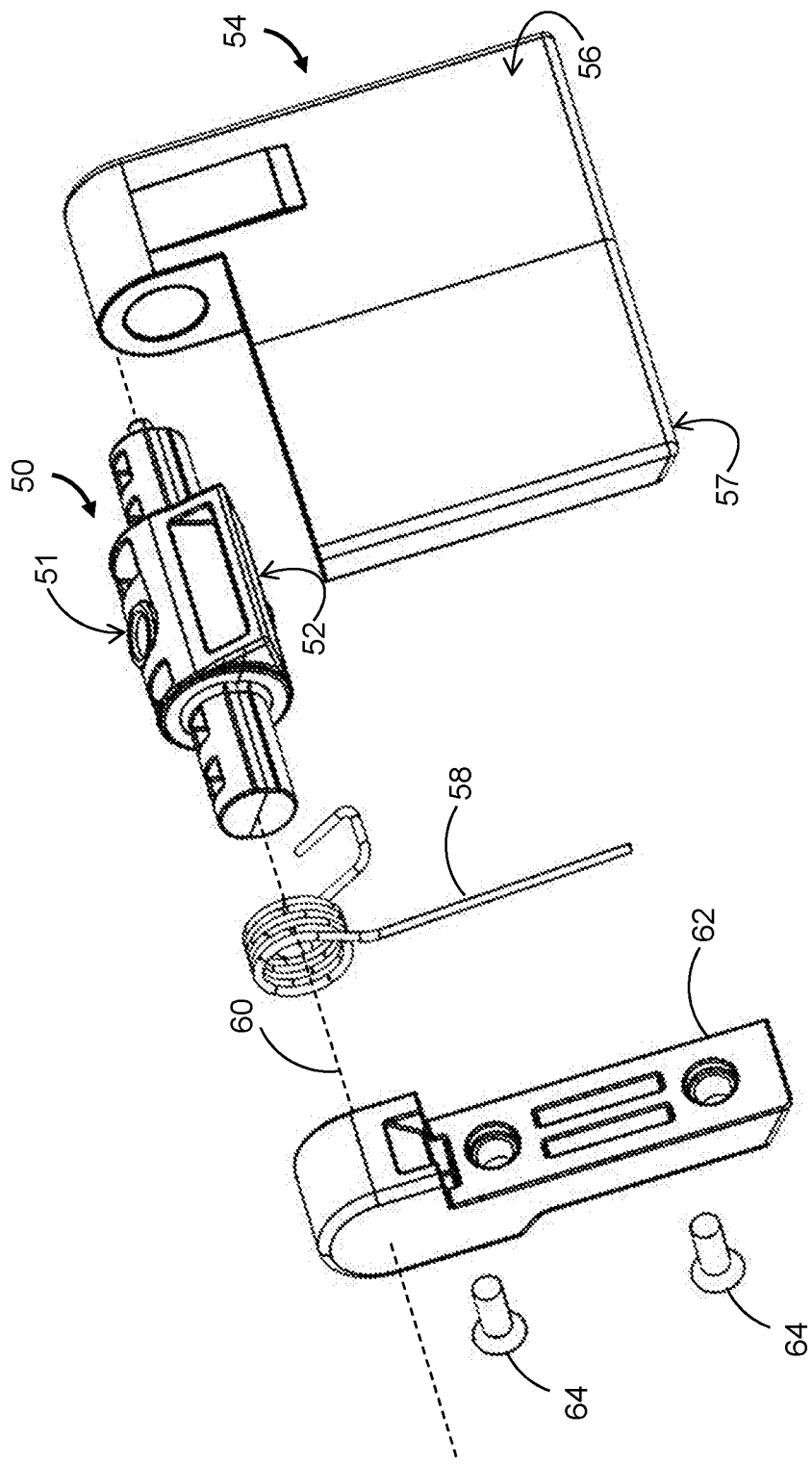
FIG. 5 shows an exploded view of the spring-loaded tab of FIG. 2.

FIG. 4 and FIG. 5 show a perspective view and an exploded view, respectively, of the spring-loaded tab 14. The tab 14 includes a first tab portion 50 having a generally cylindrical shape at its ends, a central region including a threaded passage 51 to engage the threaded rod 18, and a stop surface 52. The tab 14 further includes a second tab portion 54 that has an outer surface 56 and a ceiling clamp surface 57. In one example, the first and second tab portions 50 and 54 are made of a polymer such as acrylonitrile butadiene styrene (ABS) or other plastic. In alternative examples, the first and second tab portions 50 and 54 can be made of a different moldable material or a metal such as a die cast aluminum. A spring mechanism, such as the illustrated spring wire 58, engages the first and second tab portions 50 and 54. The second tab portion 54 is rotatable about an axis 60 that is substantially perpendicular to both the threaded passage 51 and the rod axis. A tab clamp 62 and screws 64 secure one end of the spring wire 58 to the second tab portion 54 while the opposite end is attached to the first tab portion 50. The spring wire 58 maintains the second tab portion 54 against the first tab portion 50, as shown in FIG. 4; however, with a force applied to the outer surface 56 that is sufficient to overcome the torsional force of the spring wire 58, the second tab portion 54 rotates downward about the axis 60.

Figure 6:
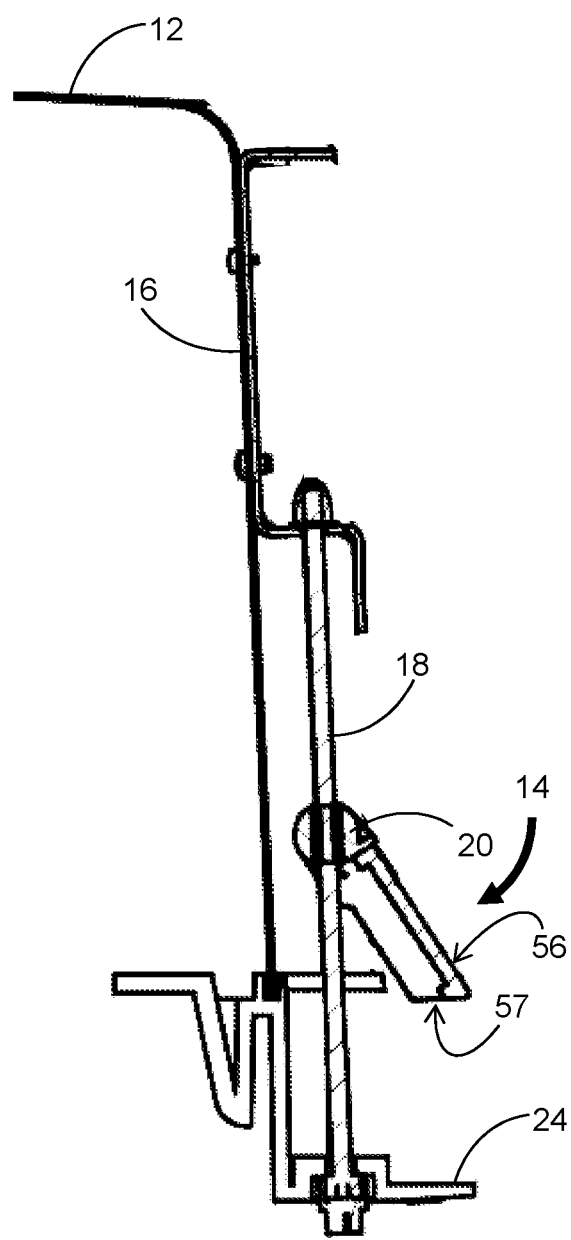
FIG. 6 is a cutaway view of a portion of the ceiling speaker system of FIG. 1A showing one mounting device in an installed configuration.

FIG. 6 illustrates a cutaway view of a portion of the ceiling speaker system 10 showing one mounting device in an installed configuration. An edge portion of the ceiling (not shown) that is adjacent to the ceiling opening resides in the gap between the speaker system flange 24 and the ceiling contact surface 57 of the second tab portion 54. Prior to completion of installation, the gap is greater than the thickness of the ceiling; however, as the threaded rods 18 are rotated to cause the speaker system 10 to rise upward through the ceiling opening, the gap decreases until the gap thickness equals the ceiling thickness. Further rotation of the threaded rods 18 results in an increasing force that clamps the ceiling between the flange 24 and the ceiling contact surface 57.

Figure 7A:
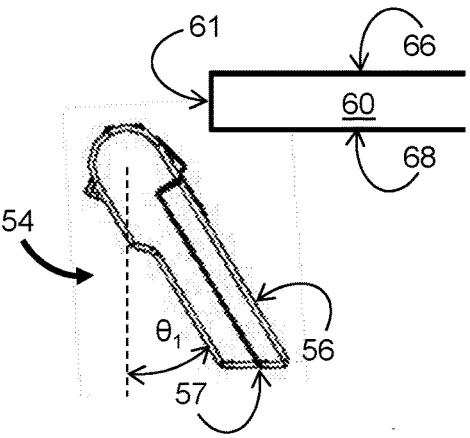
FIGS. 7A to 7D illustrate the orientation of the second tab portion of a spring-loaded tab at different times during a ceiling speaker system installation process.

The ceiling opening is sized to closely pass all but the flange 24 of the ceiling speaker system 10. More specifically, the length and width of the opening are slightly greater than the length and width of the enclosure 12 at its base so that all but the flange 24 of the speaker system 10 can freely pass through but not greater than the designed clamp range of the second tab portions 54 in their fully extended position (see FIGS. 7A and 7D). Conversely, the length and width of the ceiling opening are less than the length and width of the flange 24.

Figure 7B:
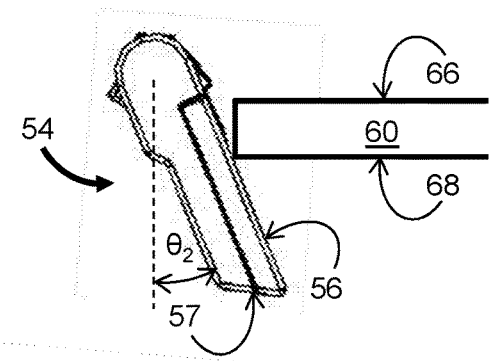
Figure 7C:
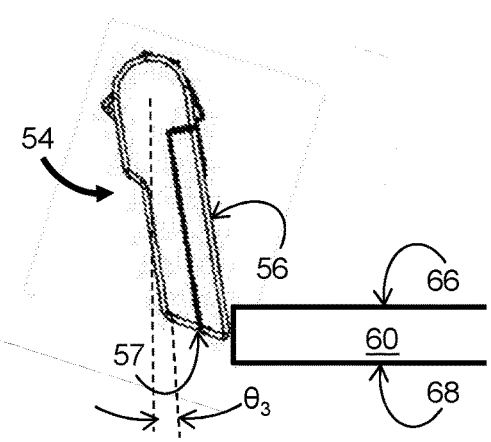
Figure 7D:
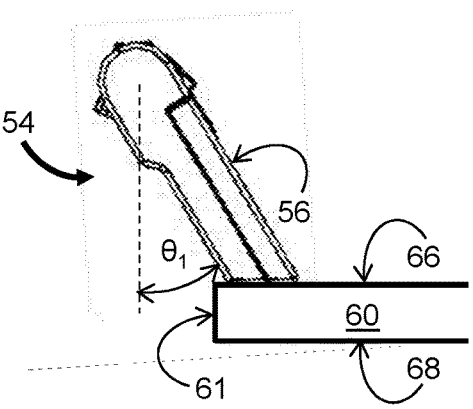

Reference is now made to FIG. 7A to 7D which depict the orientation of the second tab portion 54 of a spring-loaded tab during different times of a ceiling installation process. Prior to installation, each spring-loaded tab is in an angular position in which it has a maximum horizontal extension outward from near the base of the enclosure at an angle $\theta_1$ about axis 60 (into page, also see FIG. 4) and relative to a vertical direction. In one non-limiting numerical example, the angle $\theta_1$ is approximately 30°. As the ceiling speaker system and enclosure pass through the opening in the ceiling 60, the outer surface 56 of each second tab portion 54 comes into contact with an edge 61 of the ceiling 60 at the opening. Further upward movement urges the second tab portion 54 to rotate relative to the axis 60 through a decreasing angle $\theta_2$ as shown in FIG. 7B. Continued upward movement of the speaker system and enclosure cause the second tab portion 54 to continue to pivot inward toward the enclosure to a reduced angle $\theta_3$ about the axis 60 and to approach a vertical orientation as shown in FIG. 7C. In this manner the tabs reduce their outward extension so that they pass through the ceiling opening along with the speaker system and enclosure. Eventually, the tabs emerge past the top of the opening and the second tab portions 54 spring back outward to their initial "locked" position at an angle $\theta$. At this time, an installer can release the ceiling speaker system so that it is temporarily supported by the ceiling contact surface 57 on each second tab portion 54 which is in contact with the top surface 66 of the ceiling 60 as shown in FIG. 7D. Thus the system does not fall back through the ceiling opening and does not require an installer for support. While conveniently held in place by the tabs, the installer rotates the threaded rods (e.g., screws) with a screwdriver or other driver tool, to further raise the ceiling speaker system and enclosure until the speaker system flange comes into contact with the bottom surface 68 of the ceiling 60. Further rotation of the threaded rods results in application of a clamping force applied between the flange and the ceiling contact surfaces 57 of the second tab portions 54.

Preferably, the spring-loaded tabs are positioned in advance of the installation process at a location along the length of their threaded rods to accommodate the particular ceiling thickness such that the installer needs only to make a small number of rotations of the threaded rods to bring the flange into contact with the ceiling bottom surface 68 and apply the desired clamping force. For example, for a 2.5 cm ceiling thickness, the spring-loaded tabs may be set at an initial position along the rods to provide a gap of approximately 3.0 cm between the ceiling contact surface 57 of the second tab portion 54 and the speaker system flange.

Figure 8A:
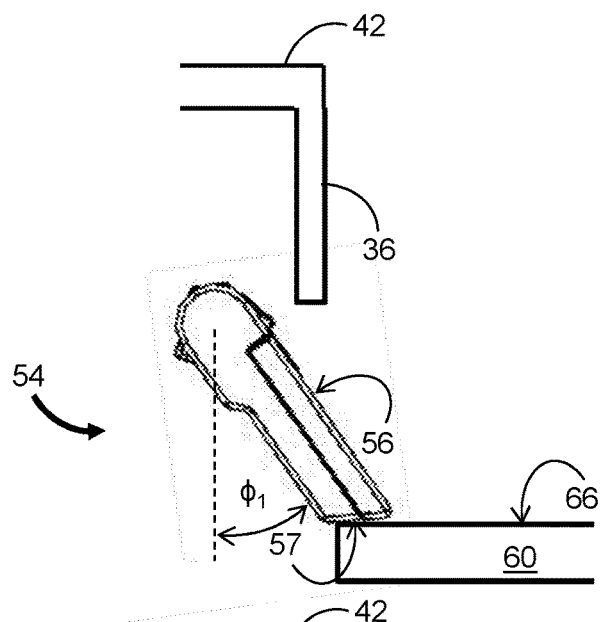
FIGS. 8A to 8C illustrate the orientation of the second tab portion of a spring-loaded tab at different times during a process for removing a ceiling speaker system from a ceiling.
Figure 8B:
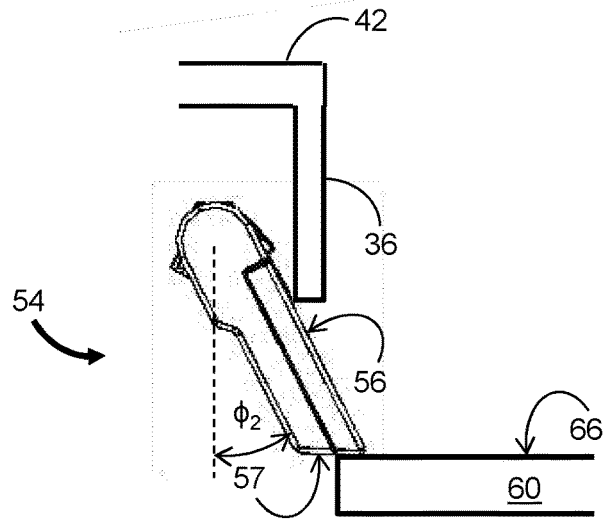
Figure 8C:
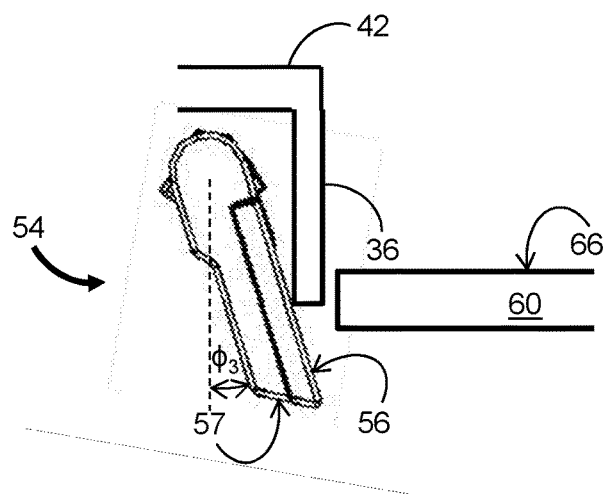

It may be desirable at a later time to remove, or "uninstall," the ceiling speaker system from the ceiling. To remove the system, the threaded rods are rotated in an opposite direction to that used during the installation process. This causes the speaker system to lower through the ceiling opening while the each spring-loaded tab remains stationary relative to the ceiling in an angular position $\phi_1$ for maximum horizontal extension as shown in FIG. 8A. During this time, the ceiling contact surface 57 of the second tab portion 54 remains in contact with the top surface 66 of the ceiling 60 but moves up the threaded rod. As the speaker system continues to pass downward through the ceiling opening, the third bracket portion 36 of each bracket engages the outer surface 56 of the second tab portion 54. Subsequent downward movement of the speaker system results in the third bracket portion 36 urging the second tab portion 54 toward a vertical orientation through a reduced angle $\phi_2$, as shown in FIG. 8B, until the angular position is at a sufficiently small angle $\phi_3$ to allow the retracted spring-loaded tab to clear the edge of the ceiling opening as shown in FIG. 8C. With all four tabs sufficiently retracted, the removal of the speaker system from the ceiling can be completed.

While the examples described above include four mounting devices per ceiling speaker system, it will be recognized that in other ceiling mount configurations fewer or more mounting devices may be used with a speaker system. Moreover, it will be recognized that the mounting devices can be used to mount other types of objects to a ceiling and to allow for their convenient removal from the ceiling.

The threaded rod used in the in installation of the ceiling speaker system to a ceiling can be over tightened, or over torqued. As a result, one or more components (e.g., threaded rod, bracket and spring-loaded tabs) of the mounting devices may be damaged. If a component of the mounting device is strengthened to prevent it from being damage during an over torque event, the failure is typically transferred to another component of the mounting device. If all mounting device components are sufficiently strengthened, the mounting substrate can be damaged. For example, ceiling tiles, plywood or other types of mounting substrates used to support the speaker system may be damaged.

In some installations, installers use electrical drills which typically provide insufficient feedback to the installer to sense when the torque has increased to a desired torque level or a maximum acceptable torque level. Alternatively, an adjustable torque screwdriver may be used to achieve the desired clamping force for an installation; however, if the screwdriver maximum torque value is incorrectly set, the applied torque may be incorrect for the installation. For example, if the value is set too low, the ceiling speaker system may become loose with time and separate from the mounting substrate. In contrast, if the value is set too high, the mounting device or mounting substrate may be damaged during installation.

Figure 9A:
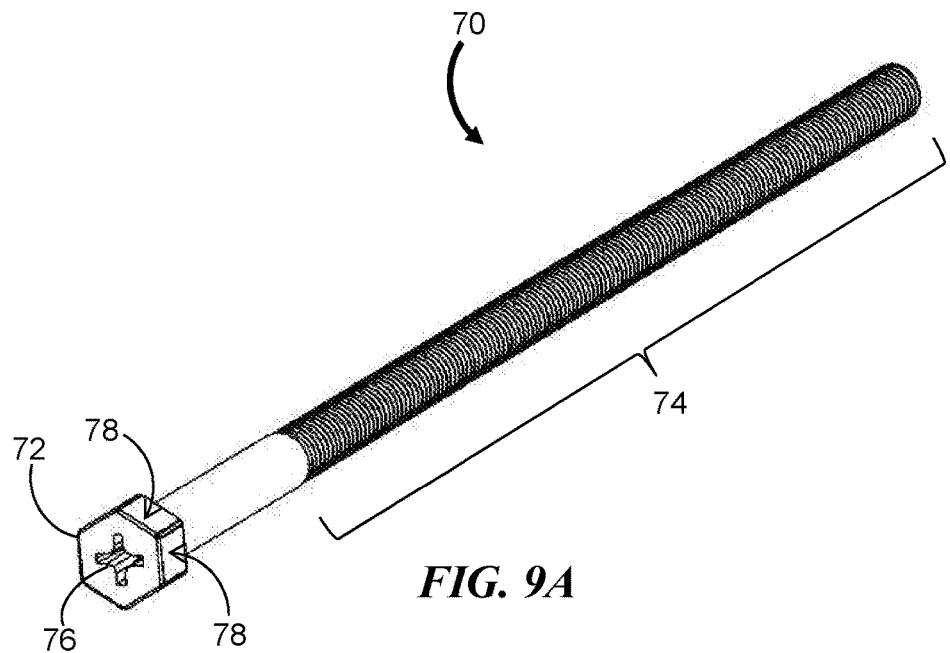
FIGS. 9A and 9B show examples of screws that can be used as threaded members in the described mounting devices.
Figure 9B:
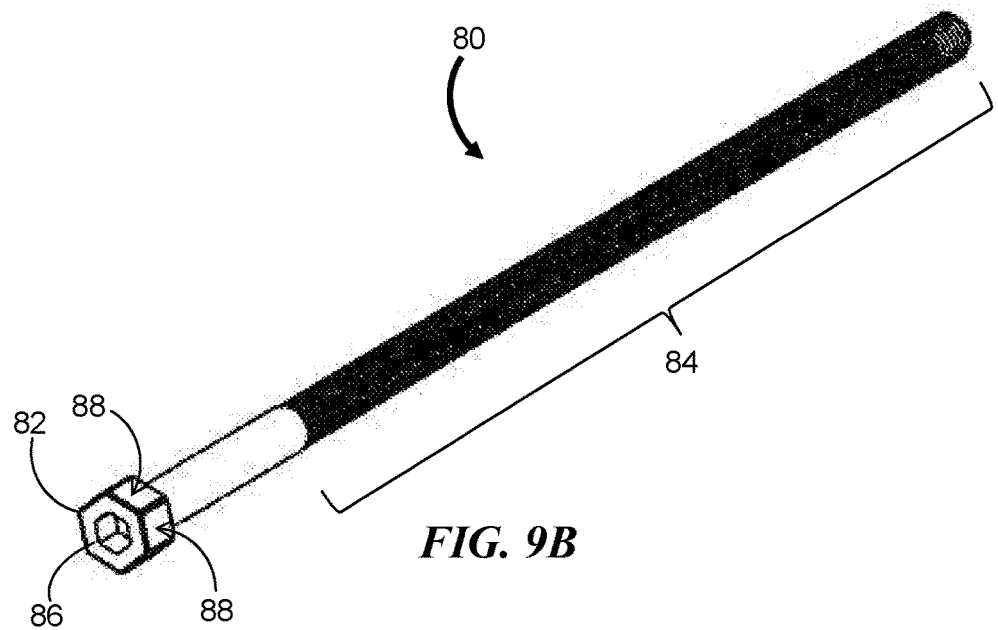

FIGS. 9A and 9B show examples of screws 70 and 80 that can be used as threaded members (e.g., elements 18 in FIG. 1) in the mounting devices described above or, more generally, as a threaded fastening member for applications in which two or more objects are fastened together. Referring also to FIG. 2, the screw 70 includes a head 72 and a threaded portion 74 to engage the threaded passage of the first tab portion of a spring-loaded tab. The head 72 has a flat surface with a "+" shaped recessed feature 76 configured to receive the tip of a Phillips® screwdriver. Similarly screw 80 has a head 82 and threaded portion 84. The head 80 has a flat surface with a hexagonal socket recessed feature 86 configured to receive a hexagonally-shaped tip of a driver tool such as a hex socket key. Both heads 72 and 82 have a hexagonal circumferential surface that includes six individual planar surfaces 78 and 88, respectively. In some implementations, the screw 70 or 80 can also be turned using a driver tool having a hexagonal socket that engages the planar surfaces 78 or 88, respectively.

Figure 10A:
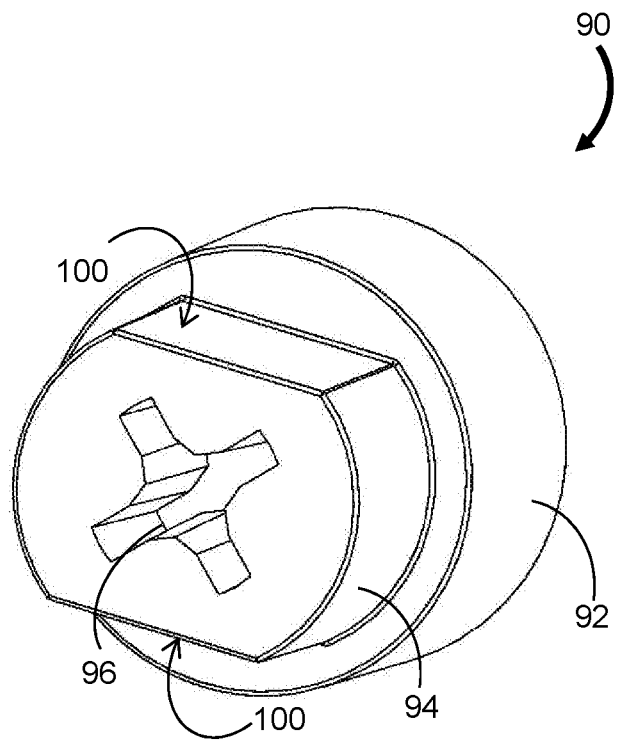
FIG. 10A and FIG. 10B show perspective front and back views, respectively, of an example of an over torque prevention device that can be used with the screw of FIG. 9A.
Figure 10B:
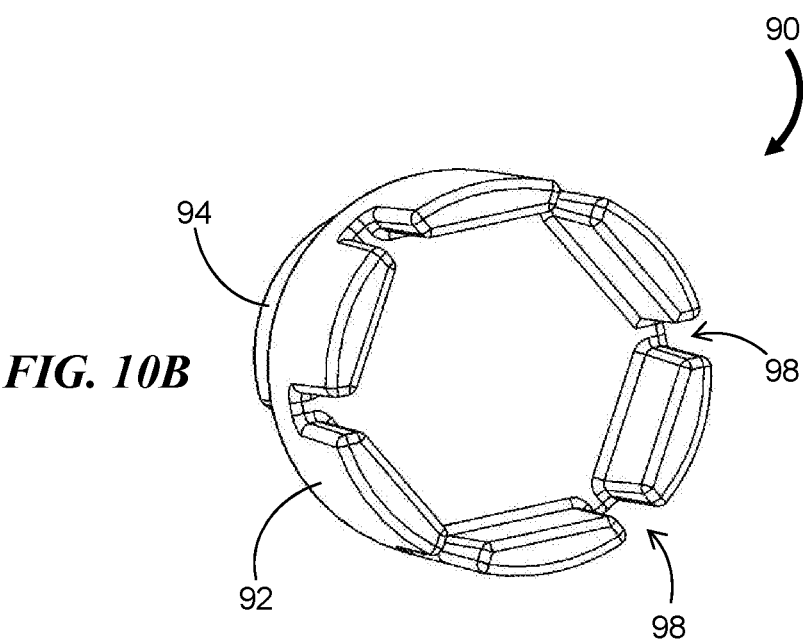

Reference is also made to FIG. 10A and FIG. 10B which show perspective front and back views, respectively, of an example of an over torque prevention device 90 that can be used with the screw 70 of FIG. 9A. The device 90 is in the form of a cap having a first portion 92 shaped to engage the head 72 of the screw 70 and a second portion 94 having a surface feature 96 shaped to receive a driver tool for applying a torque to rotate both the cap 90 and screw 70. The cap 90 is formed of a material that has a lower shear strength than the screw material so that the screw has a greater torque bearing capacity. As used herein, shear strength is the strength of the material against the type of yield or structural failure in which the material or component fails in shear. In one example, the cap 90 is formed of a plastic or other polymer and the screw may be made of a metal such as stainless steel or steel. Polymers have lower strength properties than a metal and therefore yield at lower shear values than metals. A polymer material may be selected for its yield characteristics and formed with an appropriate geometry so that the cap 90 yields at a predetermined torque.

The recessed region in the first portion 92 of the cap 90, as shown in FIG. 10B, is sized to closely receive the head 72 of the screw 70. The six "points" of the hexagonal circumferential surface occupy the six gaps 98 in the first portion 92. The cap 90 can be pressed onto the head 72 to achieve a tight interference fit such that the cap 90 is firmly secured. The installer then inserts the tip of the driver tool into the surface feature 96 and rotates the tool, causing the screw 70 to similarly rotate. As resistance to rotation increases, the installer must provide increasing torque to rotate the screw 70. When the applied torque increases to a torque limit value, the cap 90 deforms to prevent further application of torque. By way of a non-limiting numerical example, the cap 90 deforms once the applied torque increases to a value in a range from about 1.1 N m (10 in. lb.) to about 1.7 N m (15 in. lb.). In one example, the surface feature 96 deforms, is stripped or "rounds out," when the torque limit value is reached. Thus the cap 90 is rendered unusable for the further application of torque. In an alternative example, the recessed region in the first portion 92 deforms so that the cap 90 no longer tightly grips the screw head 72. Thus the cap 90 acts as a mechanical fuse to prevent the application of excessive torque to the screw 70 and excessive force to any structure being clamped or fastened by the screw 70.

In some instances, it can be necessary remove the cap 90 after deformation and installation is substantially completed. For example, the presence of the caps 90 on the threaded rods 18 of FIGS. 1A and 1B may interfere with mounting of the grille 22 to the ceiling speaker system 10. The illustrated cap 90 includes a third portion in the form of two parallel surfaces 100 shaped to receive a removal too to allow the cap 90 to be removed from the screw heads 72. For example, the surfaces 100 may be grasped by pliers and the cap 90 then pulled from the screw head 72. Advantageously, this also exposes the screw head 72 and allows for a driver tool to rotate the threaded rods 18 in the event that the speaker system is to be removed from the ceiling.

In an alternative example, the cap is shaped with two or more projections that allow a hand to act as the driver tool. An installer grasps the projections and turns the cap by hand to apply a torque that can reach the torque limit value. In one such implementation, the outer structure of the cap is shaped like a wing nut for easy manipulation.

Figure 11A:
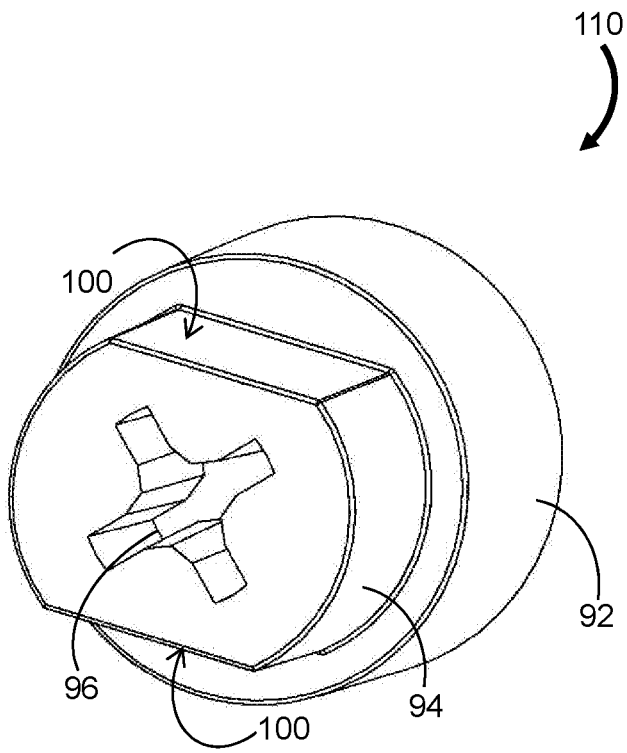
FIG. 11A and FIG. 11B show perspective front and back views, respectively, of an example of an over torque prevention device that can be used with the screw of FIG. 9B.
Figure 11B:
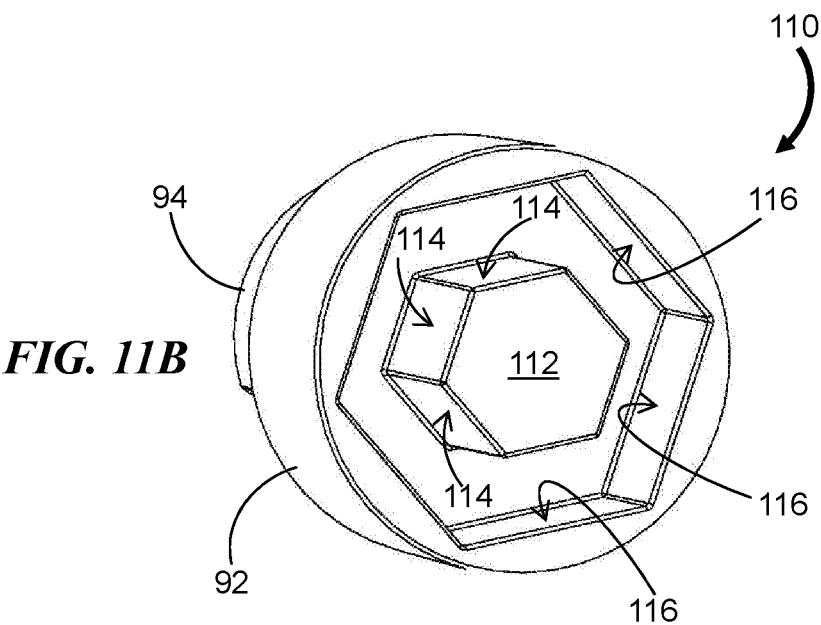

Reference is now made to FIG. 11A and FIG. 11B which show perspective front and back views, respectively, of an example of an over torque prevention device 110 that can be used with the screw 80 of FIG. 9B. The device 100 is in the form of a cap in which similar features to that of the cap 90 of FIGS. 10A and 10B are designated by similar reference numbers; however, the recessed region in the first portion 92 includes a hexagonal key extension 112 sized to closely fit the hexagonal socket recessed feature 86 in the screw head 82. When the installer applies torque that increases to a torque limit value, the cap 110 deforms to prevent further application of torque. For example, the surface feature 96 deforms or "rounds out" when the torque limit value is reached, as described above for FIGS. 10A and 10B. In an alternative example, the recessed portion in the first portion 92 deforms so that the cap 110 no longer tightly grips the screw head 82. For example, the six planar surfaces 114 of the hexagonal key extension 112 and/or the six planar surfaces 116 surrounding the recessed region may deform, or round out.

In various examples described above, the threaded fastener member is described as a screw. In alternative examples, the over torque prevention device can be attached to other types of fasteners, including bolts and hexagonal threaded nuts, having other types of fastener heads configured for use with different types of drivers. It will be recognized that the specific surfaces in the over torque prevention device may have other shapes, for example, to allow for their use with other types of fastener heads. Moreover, in light of the description provided above, it will be recognized that the specific materials, shapes, features and dimensions can vary and may be selected to achieve a desired torque limit value for particular applications.

A number of implementations have been described. Nevertheless, it will be understood that the foregoing description is intended to illustrate, and not to limit, the scope of the inventive concepts which are defined by the scope of the claims. Other examples are within the scope of the following claims.

What is claimed is:

1. A device for securing an object to a ceiling, comprising:
a threaded rod having a rod axis, a first end to receive a driver tool and a second end;
a bracket having a first bracket portion secured to a side of the object and a second bracket portion engaging the second end of the threaded rod; and
a spring-loaded tab having a first tab portion that includes a stop surface and a threaded passage in engagement with the threaded rod, a second tab portion having an outer surface, and a spring mechanism in communication with the first and second tab portions, the second tab portion being rotatable about an axis substantially perpendicular to the rod axis between a first angular position in which the outer surface is substantially parallel to the rod axis and a second angular position in which the second tab portion engages the stop surface of the first tab portion,
wherein, when the device is attached to the object and the object moves forward through an opening in the ceiling such that the outer surface of the second tab portion is in contact with a side of the opening, the second tab portion is urged from the second angular position toward the first angular position and wherein, when the object is further moved forward through the opening such that the second tab portion is no longer in contact with the side of the opening, the second tab portion engages the stop surface of the first tab portion so that the outer surface is at the second angular position.

2. The device of claim 1 further comprising a cap nut attached to the second end of the threaded rod, wherein the cap nut prevents the threaded rod from retracting from the second bracket portion.

3. The device of claim 1 wherein the bracket has a third bracket portion and wherein, when the threaded rod is rotated such that the object moves in reverse down through the opening in the ceiling, the third bracket portion engages the outer surface of the second tab portion to urge the second tab portion from the second angular position toward the first angular position.

4. The device of claim 1 wherein the spring-loaded tab includes a spring wire attached to the first and second tab portions.

5. The device of claim 4 wherein the spring wire is configured to urge the second tab portion against the stop surface of the first tab portion.

6. The device of claim 1 wherein the threaded rod is a screw and wherein the first end of the threaded rod includes a screw head configured to receive a screwdriver.

7. The device of claim 1 wherein the second tab portion has a ceiling clamp surface and wherein, after the second tab portion engages the stop surface of the first tab portion so that the outer surface is at the second angular position, the ceiling clamp surface abuts a top surface of the ceiling to support the object.

8. The device of claim 7 wherein, when the ceiling clamp surface of the second tab portion abuts the top surface of the ceiling, a rotation of the threaded rod about the rod axis further moves the object through the opening in the ceiling until a portion of the ceiling is secured between the ceiling clamp surface and a portion of the object.

9. The device of claim 1 wherein the object is a speaker system.

10. A ceiling speaker system, comprising:
a speaker system having at least one electro-acoustic driver and an enclosure;
a plurality of threaded rods each having a rod axis, a first end to receive a driver tool and a second end;
a plurality of brackets each having a first bracket portion secured to a side of the enclosure and a second bracket portion engaging the second end of a respective one of the threaded rods; and
a plurality of spring-loaded tabs each having a first tab portion that includes a stop surface and a threaded passage in engagement with a respective one of the threaded rods, a second tab portion having an outer surface, and a spring mechanism in communication with the first and second tab portions, the second tab portion being rotatable about an axis substantially perpendicular to the rod axis between a first angular position in which the outer surface is substantially parallel to the rod axis and a second angular position in which the second tab portion engages the stop surface of the first tab portion, wherein, when the speaker system moves forward through an opening in the ceiling such that the outer surface of the second tab portion is in contact with a side of the opening, the second tab portion is urged from the second angular position toward the first angular position and wherein, when the speaker system is further moved forward through the opening such that the outer surface is no longer in contact with the side of the opening, the second tab portion engages the stop surface of the first tab portion so that the outer surface is at the second angular position.

11. The ceiling speaker system of claim 10 wherein each of the brackets has a third bracket portion and wherein, when the threaded rods are rotated such that the speaker system moves in reverse down through the opening in the ceiling, the third bracket portions engage the outer surface of the second tab portions to urge the second tab portions from the second angular position toward the first angular position.

12. The ceiling speaker system of claim 10 wherein a width of the enclosure along a first horizontal axis is less than a width of the opening along the first horizontal axis and wherein a sum of the width of the enclosure along the first horizontal axis and a maximum horizontal extension along the first axis of at least one of the spring-loaded tabs is greater than the horizontal width of the opening.

13. The ceiling speaker system of claim 10 wherein the second tab portion of each of the spring-loaded tabs has a ceiling clamp surface and wherein, after the second tab portion engages the stop surface of the first tab portion so that the outer surface is at the second angular position, the ceiling clamp surface abuts a top surface of the ceiling to support the object.

14. The ceiling speaker system of claim 13 wherein, when the ceiling clamp surface of the second tab portion abuts the top side of the ceiling, a rotation of the threaded rod about the rod axis further moves the object through the opening in the ceiling until a portion of the ceiling is secured between the ceiling clamp surface and a portion of the object.

15. A device for securing an object to a ceiling, comprising:
- a threaded rod having a rod axis, a head to receive a driver tool and an end that is opposite to the head;
- a cap nut secured to the end of the threaded rod;
- a bracket having a first bracket portion configured to be attached to a side of the object, a second bracket portion engaging the cap nut at the end of the threaded rod, and a third bracket portion at an end of the bracket that is opposite to the second bracket portion; and
- a spring-loaded tab having a first tab portion that includes a stop surface and a threaded passage in engagement with the threaded rod, a second tab portion having an outer surface, and a spring mechanism in communication with the first and second tab portions, the second tab portion being rotatable about an axis substantially perpendicular to the rod axis between a first angular position in which the outer surface is substantially parallel to the rod axis and a second angular position in which the second tab portion engages the stop surface of the first tab portion, wherein, when the device is attached to the object and the object moves forward through an opening in the ceiling such that the outer surface of the second tab portion is in contact with a side of the opening, the second tab portion is urged from the second angular position toward the first angular position, wherein, when the object is further moved forward through the opening such that the second tab portion is no longer in contact with the side of the opening, the second tab portion engages the stop surface of the first tab portion so that the outer surface is at the second angular position, and wherein, when the threaded rod is rotated such that the object moves in reverse down through the opening in the ceiling, the third bracket portion engages the outer surface of the second tab portion to urge the second tab portion from the second angular position toward the first angular position.

16. The device of claim 15 wherein the spring mechanism comprises a spring wire.

17. The device of claim 16 wherein the spring wire is configured to urge the second tab portion against the stop surface of the first tab portion.

18. The device of claim 15 wherein the second tab portion has a ceiling clamp surface and wherein, after the second tab portion engages the stop surface of the first tab portion so that the outer surface is at the second angular position, the ceiling clamp surface abuts a top surface of the ceiling to support the object.

19. The device of claim 18 wherein, when the ceiling clamp surface of the second tab portion abuts the top surface of the ceiling, a rotation of the threaded rod about the rod axis further moves the object through the opening in the ceiling until a portion of the ceiling is secured between the ceiling clamp surface and a portion of the object.

\* \* \* \* \*